United States Patent
Both et al.

(10) Patent No.: US 9,388,688 B2
(45) Date of Patent: Jul. 12, 2016

(54) WET SCRUBBER HAVING A COMPACT DEMISTER THAT REQUIRES REDUCED ENERGY DEMAND

(75) Inventors: Reinhold Both, Gelsenkirchen (DE); Christian Haubold, Gladbeck (DE)

(73) Assignee: CFT GmbH, Gladbeck (DE)

( * ) Notice: Subject to any disclaimer, the term of this patent is extended or adjusted under 35 U.S.C. 154(b) by 47 days.

(21) Appl. No.: 14/009,824

(22) PCT Filed: Feb. 9, 2012

(86) PCT No.: PCT/DE2012/000127
§ 371 (c)(1),
(2), (4) Date: Oct. 4, 2013

(87) PCT Pub. No.: WO2012/136177
PCT Pub. Date: Oct. 11, 2012

(65) Prior Publication Data
US 2014/0020562 A1      Jan. 23, 2014

(30) Foreign Application Priority Data
Apr. 7, 2011   (DE) .................. 10 2011 016 289

(51) Int. Cl.
| | |
|---|---|
| *E21B 21/00* | (2006.01) |
| *B01D 46/00* | (2006.01) |
| *B01D 46/52* | (2006.01) |
| *B01D 47/06* | (2006.01) |
| *E21C 35/22* | (2006.01) |
| *E21F 5/20* | (2006.01) |

(52) U.S. Cl.
CPC ............... *E21C 7/08* (2013.01); *B01D 46/003* (2013.01); *B01D 46/0079* (2013.01); *B01D 46/0082* (2013.01); *B01D 46/521* (2013.01); *B01D 47/06* (2013.01); *E21C 35/223* (2013.01); *E21F 5/20* (2013.01)

(58) Field of Classification Search
None
See application file for complete search history.

(56) References Cited

U.S. PATENT DOCUMENTS

| | | | | |
|---|---|---|---|---|
| 2,071,806 | A * | 2/1937 | Walker | ........................ 55/499 |
| 2,387,473 | A * | 10/1945 | Spitzka | ............... F24F 5/0035 |
| | | | | 261/118 |

(Continued)

FOREIGN PATENT DOCUMENTS

| | | |
|---|---|---|
| BE | 587693 A | 6/1960 |
| DE | 2348269 A1 | 4/1974 |

(Continued)

*Primary Examiner* — Duane Smith
*Assistant Examiner* — Phillip Shao
(74) *Attorney, Agent, or Firm* — James Creighton Wray; Meera P. Narasimhan

(57) ABSTRACT

A wet scrubber 1 with a low energy requirement, i.e. with reduced throughflow resistance has a demister 5, whose filter package 25 is shaped corrugated or folded. This makes a large surface available to ensure reliable soaking of the inflowing dust. Further advantages are a sloping bottom plate 15 in the demister part housing 4, specially positioned and designed moistening nozzles 6, 7 as well as above all a partitioning of the demister 5 into several complete packages 31, 33.

27 Claims, 4 Drawing Sheets

(56) References Cited

U.S. PATENT DOCUMENTS

| | | | |
|---|---|---|---|
| 2,567,030 A * | 9/1951 | Schaaf | 55/489 |
| 2,989,145 A | 6/1961 | Goodloe | |
| 3,471,023 A * | 10/1969 | Rosaen | 210/223 |
| 3,620,375 A * | 11/1971 | Atkins | 210/484 |
| 4,253,854 A | 3/1981 | James | |
| 5,039,315 A * | 8/1991 | Liao et al. | 95/214 |
| 5,145,236 A * | 9/1992 | Liao et al. | 299/12 |
| 5,178,654 A | 1/1993 | Cowley | |
| 6,126,707 A * | 10/2000 | Pitzen | 55/495 |
| 6,312,504 B1 * | 11/2001 | Both et al. | 95/214 |
| 6,969,428 B2 * | 11/2005 | Guiduzzi et al. | 118/326 |
| 2004/0250520 A1 * | 12/2004 | Both | 55/385.5 |
| 2005/0223902 A1 * | 10/2005 | Lovell | 96/134 |

FOREIGN PATENT DOCUMENTS

| | | |
|---|---|---|
| DE | 3213642 A1 | 12/1982 |
| DE | 102004012967 A1 | 12/2004 |
| EP | 1486642 A2 | 12/2004 |
| GB | 2088743 A | 6/1982 |
| GB | 2099329 A | 12/1982 |
| GB | 2343850 A | 5/2000 |
| WO | 0064561 A2 | 11/2000 |
| WO | 2008099323 A2 | 8/2008 |

* cited by examiner

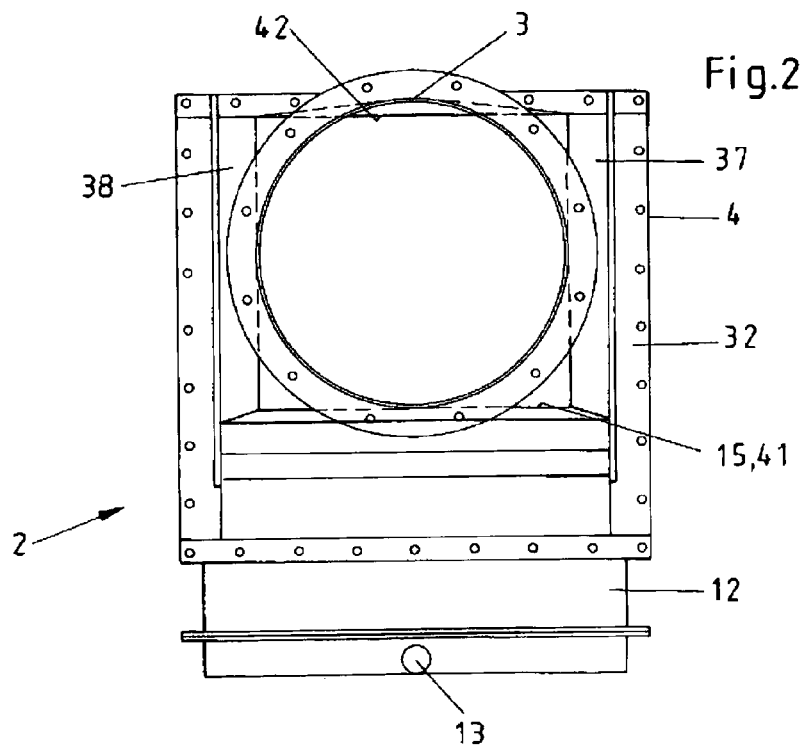
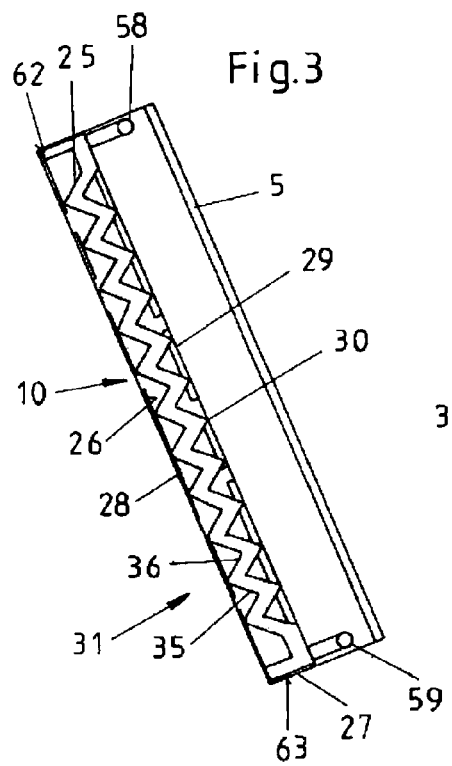
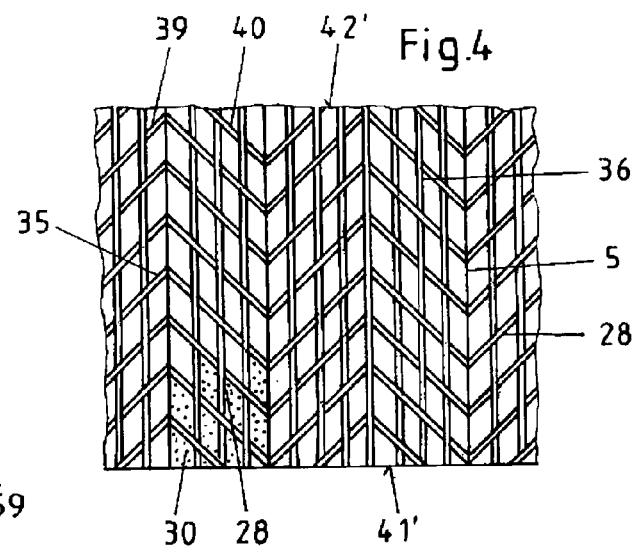

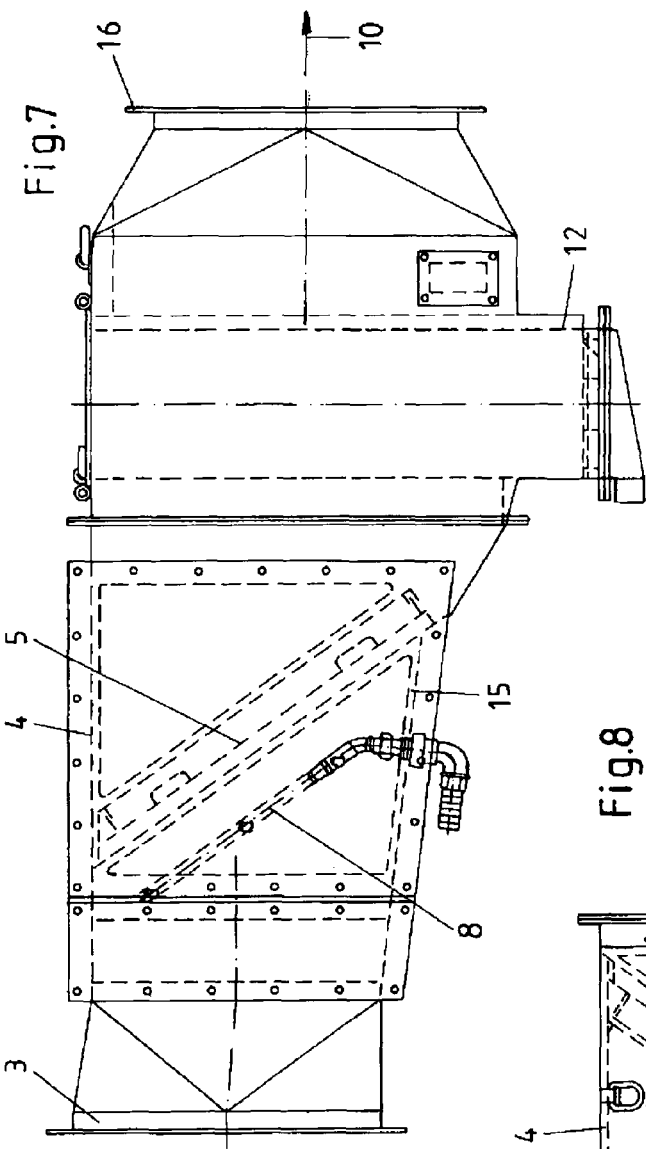
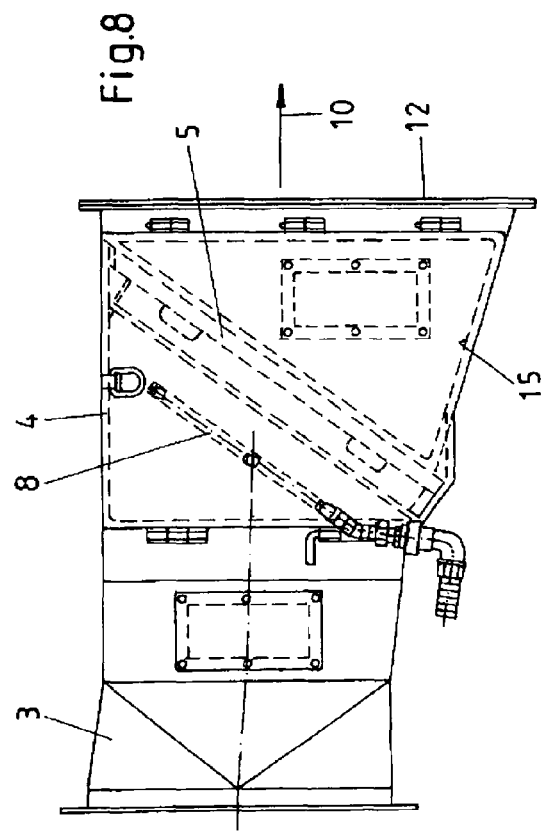

WET SCRUBBER HAVING A COMPACT DEMISTER THAT REQUIRES REDUCED ENERGY DEMAND

This application claims the benefit of German Application No. 10 2011 016 289.5 filed Apr. 7, 2011, and PCT/DE2012/000127 filed Feb. 9, 2012, International Publication No. WO 2012/136177, which are hereby incorporated by reference in their entirety as if fully set forth herein.

The invention concerns a wet scrubber for use in underground mining and tunnel construction in the framework of dust control, with a scrubber housing with an assigned fan and a demister fitted with moistening nozzles and a downstream mist collector and water tank with valve-controlled freshwater inlet for circulating water.

A wet scrubber of this type is familiar in principle from DE 198 53 190 A1. With this wet scrubber, the necessary fan is located between the inlet and outlet side upstream from the demister and the mist collector. To guarantee the necessary moistening or soaking of the dust, both the demister, which is located practically horizontally hanging in the air flow, and the fan propeller are fitted with assigned moistening nozzles. In this way, the fan propeller is heavily loaded by dust and also by water drops. According to DE 103 26 601.1 A1, a deduster designed as a wet scrubber is fitted with a demister arranged at a slant that is built on and encloses a steel wool package and in this way ensures optimum soaking or wetting of the dust-laden aerosol-generated air. In addition, the moistening nozzles are designed as intensively functioning multijet nozzles. Finally, the fan is installed in a fan housing that is built on the deduster housing behind the mist collector. The complete deduster housing and the fan housing as well are soundproofed with sound absorbers. A disadvantage of these dedusters designed as wet scrubbers is that the demisters that are used are relatively heavy, that is have a great weight, and can thus only be installed with great effort. In addition, the installation is made more difficult with a lack of space, in that the relatively large-sized demisters cannot easily be inserted in the scrubber housing. In addition it is difficult and a disadvantage that the filter material used in the demister, above all steel wool, has a high energy requirement because of the tight arrangement and the long throughflow path.

The invention is therefore based on the task of creating a wet scrubber with as low an energy requirement as possible that is easy to install and dismantle.

The task is solved in accordance with the invention in that the demister has a compact filter package that is designed to be corrugated bent, edged or folded.

When a demister of this type is used a very narrow filter package can be used in the demister, because the required surface can be made available through the corrugated shape of the filter pack, without it having to have a correspondingly great thickness and thus a correspondingly heavy weight. A demister of this type therefore contributes both to a weight reduction of the complete wet scrubber as well as to a better soaking effect of the dust flowing out with the mine air, so that the cleaning effect can be clearly increased. In addition, a demister of this type with a correspondingly narrow design can be inserted safely into the scrubber housing, so that safe installation is possible even in confined road situations. Above all, however, the mine air flows through the demister with less energy, because the "thinner" filter package means less resistance.

In accordance with a practical embodiment it is provided that the filter package has on one side a corrugated bent or edged or folded surface. Usually, this specially shaped surface will be the side that the mine air flows through first, whereby the surfaces required for the "soaking" of the dust grains are then available. However, for production reasons, both surfaces of the filter package will be shaped accordingly, whereby it is also possible to provide only the rear with a corrugated shape, whereby it is important that the actual filter pack, not necessarily the support grid as well, is shaped correspondingly.

A further practical embodiment provides that the filter package is formed as a steel wool, steel textile, steel braided or expanded metal layer pack. All these materials ensure on their part that the dust that is brought with the dust-laden mine air into the wet scrubber is thoroughly soaked and then discharged together with the water as sludge. Through the shaping of the filter package, and therefore the larger wetting area available to the mine air flow, the filter package can be built in total considerably narrower and thus generates a smaller loss of pressure.

The demister, that is, the unit that ensures that the dust is correctly soaked and suppressed, has a supporting frame and a supporting grid in this that is located in the direction of the mine air with a clearance, between which steel wool or a steel textile, steel braiding or expanded metal layers are inserted in package form as the filter material, whereby the supporting grid, and thus the filter material as well, is designed to result in a corrugated bent or edged total package. An edged or bent total package of this type results in an advantageous compact element that is not only easy to install but also has the necessary stability for when corresponding mine air volumes with a correspondingly higher speed are introduced on or into the filter pack. Because steel wool or textile or braiding can only be folded or shaped to form a package with effort, it is advantageous to form the supporting grid that surrounds filter material, and thus to give the filter material the necessary corrugated form, directly after insertion. It is also possible to form the filter package correspondingly together with the supporting grids and the filter material.

It was already pointed out above that ease of installation is intended to be a significant aspect of the novel demister. Optimisation is achieved by the demister being designed in several parts, whereby two or more complete packages are introduced into the scrubber housing across the direction of the mine air joined together and are fitted and pressed together through the housing door that is to be closed. In this way, individual elements with smaller and lower dimensions are provided that naturally can be better transported and at the same time can also be accommodated more easily in the scrubber housing. Depending on the installation location, it is possible to accommodate two, three or even four complete packages of this type in sequence in the scrubber housing and in this way to create an aggregate unit that satisfies the necessary conditions, i.e. can free the corresponding mine air volumes of the dust that is brought in as well. These small complete packages can then be slid into the scrubber housing and then pressed together through the closing door in such a way that the mine air that is to be scrubbed is passed with the required certainty through the filter packages as well, that is, is scrubbed. It is conceivable that rubber seals are placed between the supporting frames in order to create absolute seal tightness. However, it will usually be sufficient if metal is simply pressed against metal.

The dust material wetted in the demister is discharged from the demister together with the water mist generated by the nozzles as muddy water. In order to prevent muddy water from entering the mist collector from the demister in excessive volumes, among other things it is provided that the corrugations formed by the supporting grid and the filter material are designed to run from housing side wall to housing side wall, so that consequently the crests run from the part housing floor to the part housing cover, or in the reverse direction. This corrugated shape, or, better, the corrugation direction, facilitates the dripping of the muddy water in the direction of the part housing floor, so that it can then be transported further without problems and does not enter the mist collector in the first place.

The dripping of the muddy water from the demister is facilitated further in that the demister with its corrugated complete package is located in the scrubber housing either in the direction of the mine air or contrary to the direction of the mine air sloping or standing vertically. With this positioning deviating from the horizontal, the muddy water can flow slowly but safely downwards at the demister, i.e. in particular the filter package made of steel wool or similar, whereby the slant in the direction of the mine air is optimal, i.e. if the lower demister edge points further in the direction of the mist collector than the upper edge.

The running off of the muddy water in the direction of the mist collector, where the dirty water drain is, is facilitated by the base plate in the area of the demister sloping in the direction of mist collector and that the dirty water drain is assigned to the mist collector. Because dirty water or even more or less clean water also drains from the mist collector, the complete drain water or dirty water can be collected and discharged together at the last point, that is, the mist collector. From here, it passes to the water tank, where it is scrubbed, so that the water can be led into the circular flow.

A particularly advantageous wetting effect and thus a scrubbing effect as well in the demister is facilitated in particular by the moistening nozzles being arranged with the nozzle opening pointing to the demister, and thus in the direction of the mine air, and at a distance from the surface that results in complete coverage of the surface. The mist cones generated by the moistening nozzles are shaped in such a way that they overlap each other on the surface of the demister, so that in any case each part area of the demister or of the demister surface is really wetted in such a way that the impinging dust grains can be integrated and then drained.

It was already pointed out above that the dusty wastewater is fed into a tank to be "processed" there. This is then particularly effective if the water tank has one or more cascades, the tank floor slopes in the direction of the sludge discharge and sludge preseparator, preferably a hydrocyclone, is assigned to the wastewater inlet. Before the water enters the water tank in the first place, it passes through a hydrocyclone, so that a large amount of dust particles, that is, of sludge, can already be separated, before the rest enters the first cascade of the water tank. The successively arranged cascades ensure that the remaining wastewater come to rest, so that the sludge particles fall to the bottom of the tank and then slide automatically in the direction of the sludge drain, where they are discontinuously sucked out or led off. It is advantageous for this that the tank bottom slopes appropriately. Seen on the whole it is possible in this way to process the heavily muddy water so far that it can then be sprayed again into the dust-laden mine air through the existing moistening nozzles. This complete processing of the muddy water is advantageous, because, under ground in particular, the otherwise large volumes of water that accumulate can only be led off and disposed of with considerable problems. In contrast, the sludge can usually be disposed of or reprocessed without great effort.

Because it cannot always be avoided that sludge flakes or similar still accumulate in the last cascade, it is advantageous if the water tank has a clean water drain with a pump and a suction device reaching into the last cascade, whereby the intake of the suction device is covered by very finely woven wire mesh. These sludge flakes are retained in this wire mesh, so that really mainly purified water is conveyed further by the pump. Where required, such a wire mesh can be cleaned as well without great effort, whereby this is usually done by means of backwashing measures.

It has been mentioned several times that complete packages with advantageous dimensions can be easily installed and transported as well. This is facilitated further in that the supporting frame is fitted with handles projecting over the complete package or the complete packages that are allocated to both lengthways sides and are attached at a distance from the upper and lower frame. There are thus four handles available per complete package, so that during installation the actual supporting frame does not have to be grasped but only the handles in question.

The invention is characterised in particular in that a wet scrubber that is easy to assemble and also dismantle, or a demister provided for this, is made available that in addition is less energy-intensive, because a demister is made available that has a very narrow filter package that is designed folded or in any case with a corrugated surface so that a large contact surface is available to wet and bind the inflowing dust particles with the sprayed water. The invention is further characterised in that the demister can be partitioned so that, in spite of "small" individual parts, the necessary dimensions for a wet scrubber can be achieved by using smaller complete packages. Small complete packages of this type are not only easy to transport, they are also easy to assemble and dismantle even in cramped conditions, for example in underground roads.

Further details and advantages of the subject-matter of the invention result from the following of the associated drawing, in which a preferred embodiment is shown with the necessary details and individual parts.

BRIEF DESCRIPTION OF THE DRAWINGS

FIG. 2 shows a front view of such a wet scrubber,
FIG. 3 shows a side view of a demister with corrugated filter package,
FIG. 4 shows a front view of the filter package in accordance with FIG. 3,
FIG. 7 shows a down-scaled reproduction of the wet scrubber in accordance with FIG. 1 with a demister positioned sloping contrary to the direction of the mine air,
and
FIG. 8 shows a part view of the wet scrubber with a demister positioned sloping in the direction of the mine air.

DETAILED DESCRIPTION

Figure 1:
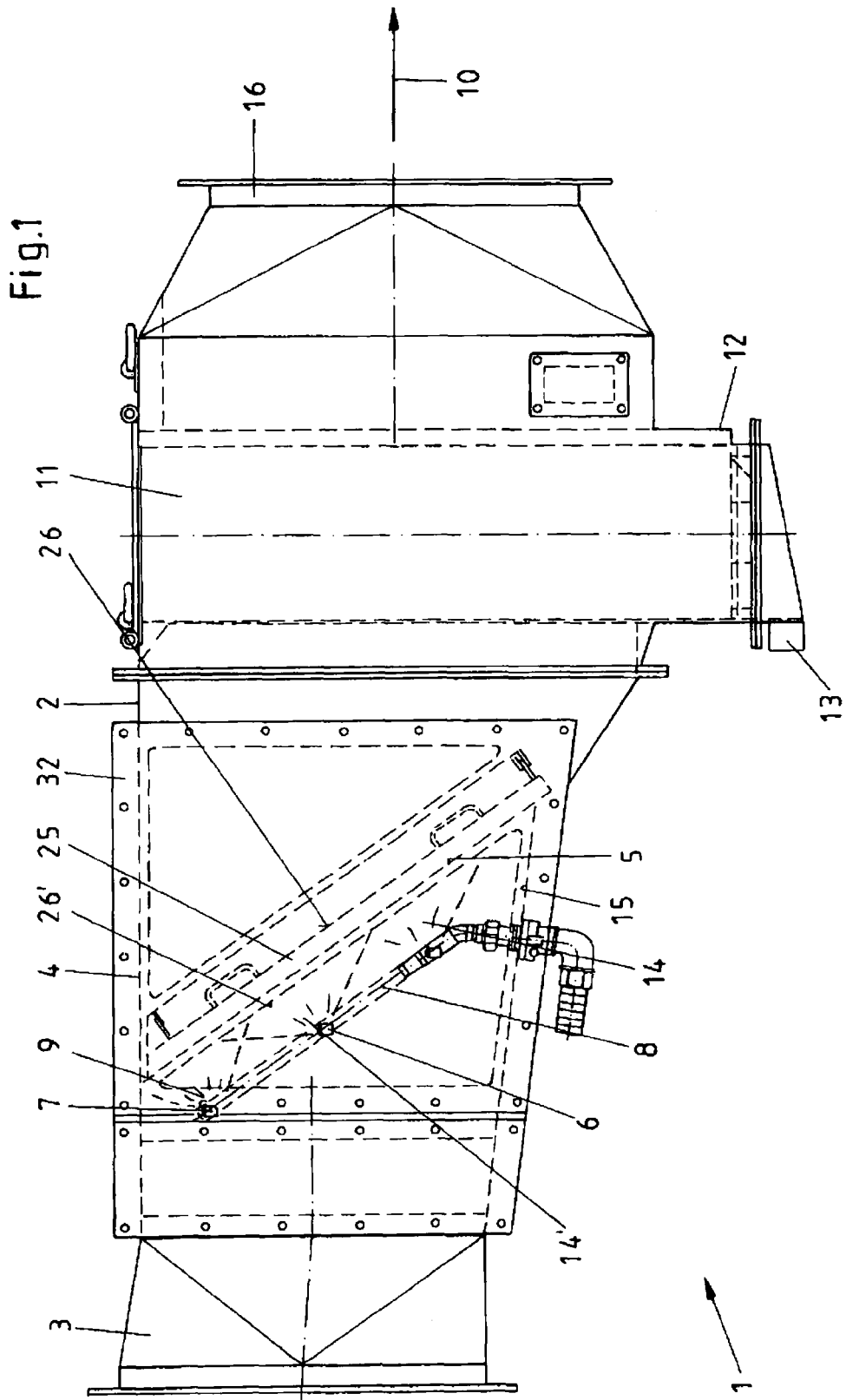
FIG. 1 shows a wet scrubber, partly with open side areas.

With the wet scrubber 1 reproduced in FIG. 1 the scrubber housing 2 is shown opened in the area of the demister 5, but closed in the remaining area. According to this, the demister part housing 4 with the demister 5 connects to the mine air inlet pipes 3, whereby the dust-laden mine air wetted through the moistening nozzles 6, 7 is then led in the direction of the mine air into the mist collector 11, whose mist collector part housing 12 has a sloping floor to which the dirty water drain 13 connects.

What cannot be seen in FIG. 1 is that the surface 26 of the filter package 25 of the demister 5 is corrugated. This results all the more clearly from the other Figures. The moistening nozzles 6, 7 directed towards the opposite surface 26' of the demister 5 are assigned to a nozzle frame 8 and arranged so that their nozzle openings 9 point towards the demister 5. It is also indicated here in FIG. 1 that the wetting cones 14, 14' generated by the moistening nozzles 6, 7 overlap shortly before reaching the surface 26' of the demister 5. This ensures that in fact all dust particles impinging on the demister 5 are wetted with water and bound in the water droplets.

The housing of the fan 16 that is only indicated here connects to the mist collector part housing 12.

It can be seen from FIG. 1 that the bottom plate 15 of the demister part housing 4 is designed sloping in the direction of the mist collector 11, so that the dusty or muddy water leaves the demister part housing 4 safely and flows into the mist collector part housing 12, in order then to leave this through the dirty water drain 13.

It is indicated in the area of the demister part housing 4 that its edge has numerous screw holes. The housing door 32 that is not shown here is attached using these screw holes in order to close the demister part housing 4 and at the same time to fix the demister 5 effectively.

FIG. 2 shows the scrubber housing 2 seen from the inflow area of the dust-laden mine air, whereby it is clear that the mine air inlet pipe 3 is circular, because mine air ducts must be connected here. This round mine air inlet pipe 3 passes into the box-shaped demister part housing 4, whereby it is noticeable that the bottom plate 15 or the part housing floor 41 slopes, namely in the viewing direction. The housing door is designated 32, which represents a housing wall 37. The opposite housing side wall is designated 38. While the part housing floor has the reference number 41, the part housing cover has the reference number 42.

FIG. 3 shows a side view of the demister 5. It is clearly noticeable here that the filter package 25 has a corrugated design. The supporting frame 27 supports two supporting grids 28, 29 for the filter package 25, whereby these supporting grids 28, 29 also have a corrugated design, as does the actual filter package 25 as well. It is not noticeable here that a steel wool is used as filter material 30, whereby this steel wool is shaped into a steel wool package, which is designated as filter package 25. The supporting frame 27 with the supporting grids 28, 29 and the filter package 25 form a complete package 31, whose handling or whose assembly and dismantling is facilitated in that side handles 58, 59 are provided. The corrugations formed by filter package 25 are designated 35 and 36. These corrugations 35, 36 with their corrugation peaks 39, 40 run, as FIG. 4 shows, from part housing floor 41 to part housing cover 42, or vice versa. In FIG. 4 it becomes clear that the supporting grids 28, 29 form the corrugations 35, 36 or corrugation peaks 39, 40 as well. The filter material 30 filled between this acquires the corrugated shape automatically when it is being pressed between the two supporting grids 28, 29.

Figure 5:
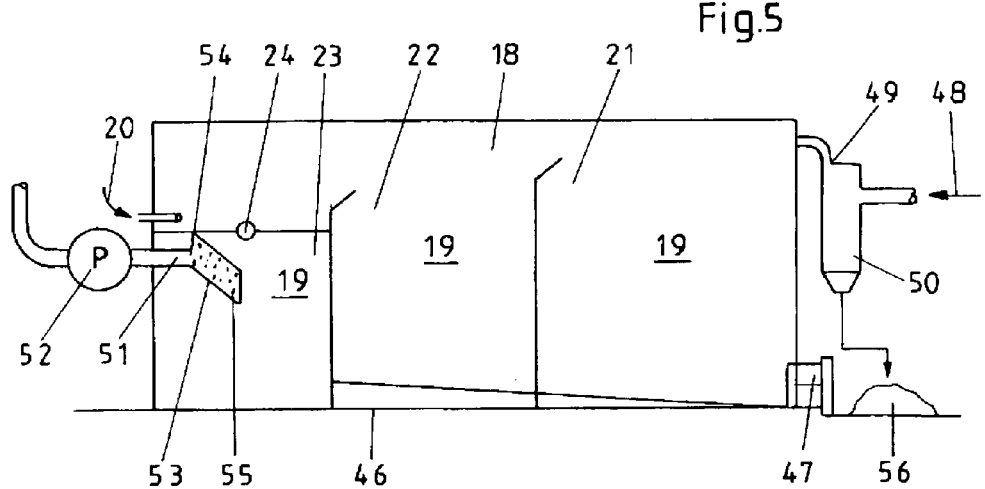
FIG. 5 shows a diagrammatic water tank.

FIG. 5 shows the water tank 18 into which the dirty, i.e. dusty, water is passed. Before the circular flow water 19 is filled into the first cascade 21 it runs through a sludge pre-separator 49 in the form of a hydrocyclone 50. This means that partly scrubbed wastewater already flows into cascades 21, 22, 23 as circular flow water 19, in order to be supplemented by water leaving the fresh water inlet 20. This fresh water inlet 20 has a float gauge 24 that, if a specific water level is not reached, ensures that fresh water is added.

The sludge leaving the hydrocyclone 50 is designated 56. It is recycled further with the sludge leaving the sludge drain 47. This sludge is led off from the water tank 18, for which purpose the tank bottom 46 slopes, as can be seen in FIG. 5. The sludge slides as it were automatically in the direction of the sludge drain 47.

The wastewater inlet is designated with reference number 48, the clean water drain on the opposite side of the water tank 18 with 51. Here a pump 52 ensures that the water is pumped out of the last cascade 23, for which purpose there is a suction device 53, whose intake 54 is covered with a finely woven wire mesh 55.

Figure 6:
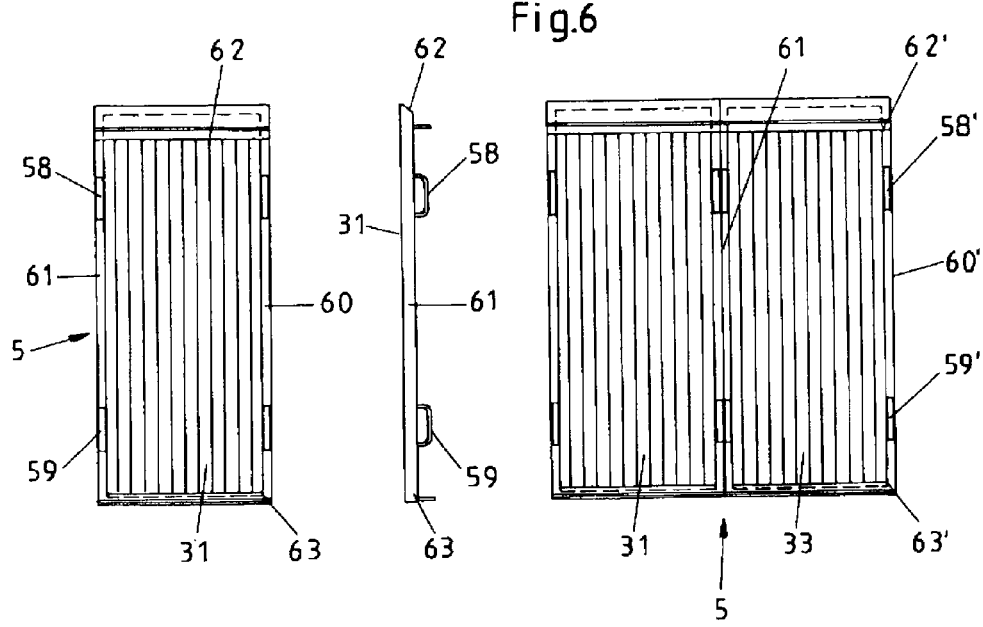
FIG. 6 shows a front and a side view of a filter or a complete package or of two complete packages joined together.

For a further explanation of the demister 5 FIG. 6 shows a complete package 31 that is joined together on the right side with another complete package 33 to form a demister 5. It can be seen that the previously mentioned handles 58, 59 are provided at the upper frame edge 62 and at the lower frame edge 63, namely on both the long side 60 as well as on the long side 61. In this way, such a complete package 31 or 33 can be easily transported and assembled as well, whereby the side view in the middle between the two representations makes it clear that the total complete package 31, 33 is very narrow. This means that because of the low edge height, and also because of the other small dimensions, it can be easily installed and dismantled as well even in the confined spaces in underground mining, for example in ascending roads, i.e. inserted in the scrubber housing 2, above all pushed in and then pressed by attaching the housing door 32 in the way shown on the right-hand side of FIG. 6.

FIGS. 7 and 8 are intended to make it clear that demister 5 can be arranged sloping both against the direction of the mine air 10 (FIG. 7) and in the direction of the mine air 10. FIG. 8, which shows the latter slope, makes it clear again how the part housing floor 41 and its bottom plate 15 slope in order to ensure the discharge of the soaked sludge or muddy water.

All the named elements, including those that can only be seen in the drawings are regarded as integral to the invention singly and in combination.

The invention claimed is:

1. Wet scrubber for use in underground mining and tunnel construction in the framework of dust control, comprising a scrubber housing (2) with an assigned fan (16) and a demister (5) including fitted moistening nozzles (6, 7), a downstream mist collector (11) and a water tank (18) with a valve-controlled fresh water inlet (20) for circular flow water (19), wherein the demister (5) comprises a supporting frame (27) and a compact filter package (25) having corrugations enclosed within the supporting frame.

2. Wet scrubber in accordance with claim 1, wherein the compact filter package (25) has on one side a corrugated bent or edged or folded surface (26).

3. Wet scrubber in accordance with claim 1, wherein the filter package (25) is a steel wool, steel textile, steel braided or expanded metal layers package.

4. Wet scrubber in accordance with claim 1, wherein the supporting frame (27) includes supporting grids (28, 29) positioned within the supporting frame with a clearance in a direction of flow of mine air (10), the filter package disposed between the supporting grids within the supporting frame and comprising steel wool or a steel textile, steel braiding or expanded metal layers inserted therein as filter material (30), the supporting grids (28, 29) and the filter material (30) being shaped to form a corrugated bent or edged complete package (31).

5. Wet scrubber in accordance with claim 4, wherein the demister (5) is formed in several parts, whereby two or more of the complete packages (31, 33) are joined together and insertable into the scrubber housing (2) across the direction of flow of mine air (10) and added and pressed together through a closing housing door (32).

6. Wet scrubber in accordance with claim 4, wherein the supporting grids (28, 29) comprise corrugations (35, 36) with corrugation peaks (39,40) and the filter material (30) run from one housing side wall (37) to another housing side wall (38), and correspondingly the corrugation peaks (39, 40) run from a part housing floor (41) to a part housing cover (42) or vice versa.

7. Wet scrubber in accordance with claim 4, wherein the demister (5) with the corrugated complete package (31, 33) is positioned either in the direction of flow of mine air (10) or against the direction of the flow of mine air (10) sloping or standing vertically in the scrubber housing (2).

8. Wet scrubber in accordance with claim 4, wherein a bottom plate (15) in the area of the demister (5) has a slope sloping away from the demister in the direction of the mist collector (11) and a dirty water drain (13) is assigned to the mist collector (11).

9. Wet scrubber in accordance with claim 4, wherein the moistening nozzles (6, 7) comprise nozzle openings (9) pointing to the demister (5) in the direction of flow of mine air (10) and are positioned a distance from the surface (26) that results in complete cover of the surface (26).

10. Wet scrubber in accordance with claim 1, wherein the water tank (18) has one or more cascades (21, 22, 23), a tank bottom (46) sloping in a direction of a sludge drain (47) and a sludge preseparator (49) assigned to a wastewater inlet (48).

11. Wet scrubber in accordance with claim 10, wherein the water tank (18) has a clean water drain (51) with a pump (52) and a suction device (53) that reaches into a last cascade (23), whereby an intake (54) of the suction device (53) is covered by a very finely woven wire mesh (55).

12. Wet scrubber in accordance with claim 4, wherein the supporting frame (27) is fitted over the complete package (31) or the complete packages (31, 33) with projecting handles (58, 59) along two long sides (60, 61) of the supporting frame and are attached at a clearance to upper and lower frame edges (62, 63).

13. Wet scrubber in accordance with claim 10, wherein the sludge preseparator (49) is a hydrocyclone (50).

14. Wet scrubber for use in underground mining and tunnel construction in the framework of dust control, comprising a scrubber housing (2) with an assigned fan (16) and a demister (5) including fitted moistening nozzles (6, 7), a downstream mist collector (11) and a water tank (18) with a valve-controlled fresh water inlet (20) for circular flow water (19), wherein the demister (5) has a compact filter package (25) with corrugations bent, edged or folded, wherein the water tank (18) has one or more cascades (21, 22, 23), a tank bottom (46) sloping in the direction of a sludge drain (47) and a sludge preseparator (49) assigned to a wastewater inlet (48), wherein the water tank (18) has a clean water drain (51) with a pump (52) and a suction device (53) that reaches into a last cascade (23), whereby an intake (54) of the suction device (53) is covered by a very finely woven wire mesh (55).

15. Wet scrubber for dust control in underground mining and tunnel construction comprising a scrubber housing, an assigned fan and a demister, the demister comprising moistening nozzles, a downstream mist collector and a water tank, the water tank comprising a valve-controlled fresh water inlet for circular flow water, wherein the demister further comprises a support frame and a compact filter package comprising corrugations enclosed within the support frame, the demister with the filter package being disposed substantially vertical to a flow direction of mine air during scrubbing processes.

16. The wet scrubber of claim 15, wherein the filter package has at least on one side a corrugated surface selected from the group consisting of bent, edged, folded surfaces and combinations thereof.

17. The wet scrubber of claim 15, wherein the filter package is selected from the group consisting of steel wool, steel textile, steel braided, expanded metal layers, and combinations thereof.

18. The wet scrubber claim 15, wherein the supporting frame comprises supporting grids positioned with a clearance in the flow direction of mine air, the filter package comprising filter material inserted within the supporting grids, the supporting grids and the filter material forming a corrugated bent or edged complete grid and filter package within the support frame.

19. The wet scrubber of claim 18, wherein the demister comprises one or more parts, wherein two or more complete grid and filter packages are inserted joined together into the scrubber housing across the flow direction of mine air and wherein the complete packages are added and pressed together through a closing housing door.

20. The wet scrubber of claim 18, wherein the demister comprises opposite side walls, a part housing floor and a part housing cover, and wherein the complete package with the supporting grids and the filter material comprise corrugations with corrugation peaks, and wherein the complete package runs from one housing side wall to another housing side wall, thereby the corresponding corrugation peaks run from the part housing floor to the part housing cover or vice versa.

21. The wet scrubber of claim 18, wherein the complete package is positioned with an upper edge angled in the flow direction of mine air.

22. The wet scrubber of claim 18, wherein the complete package is positioned with an upper edge angled away from the flow direction of mine air.

23. The wet scrubber of claim 15, further comprising a bottom plate sloping towards a direction of the mist collector and a dirty water drain communicating with the mist collector.

24. The wet scrubber of claim 15, wherein the moistening nozzles comprise nozzle openings pointing towards the demister in the flow direction of mine air and positioned a distance from a surface of the filter package to completely cover the surface.

25. The wet scrubber of claim 15, wherein the water tank comprises one or more cascades, a tank bottom sloping in a direction of a sludge drain, and a sludge preseparator communicating with a wastewater inlet.

26. The wet scrubber of claim 25, wherein the water tank comprises a clean water drain including a pump, a suction device with an intake communicating with a last cascade, and wherein the intake of the suction devices is covered by a very finely woven wire mesh.

27. The wet scrubber of claim 1, wherein the corrugations are formed by the filter package being bent, edged, or folded.

* * * * *